US011807828B2

(12) United States Patent
Castellanos

(10) Patent No.: US 11,807,828 B2
(45) Date of Patent: Nov. 7, 2023

(54) AGITATOR FOR SOLVENTLESS EXTRACTION OF CANNABIS ESSENTIAL OILS

(71) Applicant: Eduardo Castellanos, Coral Gables, FL (US)

(72) Inventor: Eduardo Castellanos, Coral Gables, FL (US)

( * ) Notice: Subject to any disclaimer, the term of this patent is extended or adjusted under 35 U.S.C. 154(b) by 502 days.

(21) Appl. No.: 16/877,731

(22) Filed: May 19, 2020

(65) Prior Publication Data

US 2021/0363462 A1 Nov. 25, 2021

(51) Int. Cl.
| | |
|---|---|
| *C11B 9/02* | (2006.01) |
| *B01D 11/02* | (2006.01) |
| *B01F 3/12* | (2006.01) |
| *B01F 7/16* | (2006.01) |
| *B01F 11/02* | (2006.01) |
| *B01F 15/00* | (2006.01) |
| *B01F 23/50* | (2022.01) |
| *B01F 23/53* | (2022.01) |
| *B01F 27/91* | (2022.01) |
| *B01F 27/808* | (2022.01) |
| *B01F 31/81* | (2022.01) |
| *B01F 35/10* | (2022.01) |
| *B01F 35/21* | (2022.01) |
| *B01F 35/221* | (2022.01) |

(52) U.S. Cl.
CPC ............ *C11B 9/02* (2013.01); *B01D 11/0257* (2013.01); *B01D 11/0265* (2013.01); *B01D 11/0288* (2013.01); *B01F 23/51* (2022.01); *B01F 23/53* (2022.01); *B01F 23/551* (2022.01); *B01F 27/808* (2022.01); *B01F 27/91* (2022.01); *B01F 31/81* (2022.01); *B01F 35/1452* (2022.01); *B01F 35/2115* (2022.01); *B01F 35/2215* (2022.01)

(58) Field of Classification Search
CPC .............................. B01D 11/0288; C11B 9/02
See application file for complete search history.

(56) References Cited

U.S. PATENT DOCUMENTS

| | | | | |
|---|---|---|---|---|
| 2017/0356789 | A1* | 12/2017 | Sutariya | ................. G01G 23/01 |
| 2019/0246591 | A1* | 8/2019 | Leo | ....................... A61K 36/185 |
| 2020/0054962 | A1* | 2/2020 | Vanaman | ................. B01D 3/38 |
| 2020/0215135 | A1* | 7/2020 | Wysocki | ............... A23L 33/105 |

* cited by examiner

*Primary Examiner* — Elizabeth Insler

(57) ABSTRACT

An apparatus for extracting cannabis essential oils. A housing is provided for containing trichome material from a cannabis plant, the housing having a sealable opening. A rotatable impeller is disposed in the housing. A container is connected to the housing for collecting essential oils. The process for extracting cannabis essential oils includes the steps of introducing trichome material from the cannabis plant into the housing, introducing water and ice into the housing via an opening therein, and agitating the water and ice and the trichome material to separate and extract essential oils therefrom.

7 Claims, 15 Drawing Sheets

AGITATOR FOR SOLVENTLESS EXTRACTION OF CANNABIS ESSENTIAL OILS

FIELD OF THE INVENTION

The present invention relates to solventless extraction of cannabis essential oils and, more particularly, to providing a method and an apparatus having an impeller therein for agitating water and biological trichomes to separate and extract essential oils therefrom.

BACKGROUND OF THE INVENTION

Cannabis extract has wide-ranging beneficial effects on a number of medical conditions. Chronic pain has been shown to be controlled by use of cannabis. Use of a topical application of cannabis extract in dermal penetrating cream has been effective in relieving chronic pain conditions of arthritis and tendonitis. The use of a topical application of the extract in a penetrating cream formulation allows the medication to directly affect the local receptor sites. This direct application at the affected sites allows rapid modulation of the pain and inflammation of these chronic conditions.

A specific pain condition that has been effectively treated by the use of cannabis extract is fibromyalgia. This chronic debilitating condition involves local pain at specific sites on the body. The use of this extract allows stimulation of the CB2 receptor sites in the local pain areas as well as stimulation of the CB1pns receptors. This disease, which is a combination of autoimmune and inflammatory conditions, responds extremely well to topical applications of cannabis extract.

Autoimmune diseases also seem to respond very well to the application of cannabis extract. This is because of the action on the CB2 receptors which are located on several different cells lines in the immune system. Through the inhibition of TCF, alpha cannabis has a beneficial effect on patients with multiple sclerosis and lupus. These severe and chronic autoimmune diseases have been shown in several studies to respond to smoked cannabis. Topical application is effective without the psychoactive side effects. By selective stimulation of the CB2 receptors the immune modulation effects of the cannabis extract have a beneficial effect on multiple sclerosis and lupus without central nervous system effects.

Nausea and vomiting that are unresponsive to other medications have been shown to be helped through the use of cannabis. The use of cannabis extract has a modulating effect on nausea and vomiting without the psychoactive properties that smoking the Cannabis plant can cause in a mammal. This has been shown to be especially useful in helping with the side effects of chemotherapy. Additionally, animal studies show an increase in hunger and feeding behavior through the action of the CB2 receptors.

Applying topical cannabis extract has a positive effect on the healing of psoriasis lesions. The cannabis plant contains resinous trichrome structures which are the source of cannabinoids, such as tetrahydrocannabinol (THC) and cannabidiol (CBD). Devices and methods of using cannabis ideally seek to separate the trichromes from the accompanying plant material. However, the plant material contains terpenoids and flavonoids, which provide desirable odor and flavor as well as a beneficial synergistic entourage effect. The traditional method of using cannabis has been to smoke the leaves and buds of the plant, but the combustion of the whole plant material introduces noxious components to the body in addition to desirable cannabinoids, terpenoids, and flavonoids.

To maximize the production and preservation of the cannabinoid, terpenoid, and flavonoid components, while minimizing the amount of plant material, a number of extraction methods have been used. Rosin refers to a resinous extract product created from an extraction process applied to cannabis starting material that utilizes a combination of heat and pressure. With cannabis, the heat and pressure method can be used either with flowers or less desirable leaves of the cannabis plant and can also be used to clean up water hash and sifted kief into a full-melt hash oil of high purity. The result is a translucent, sappy, and sometimes clear and brittle glass-like product. If executed correctly, rosin can rival or surpass the flavor, potency, quality, and yield of other solvent-based extraction products with increased safety and ease. One reason for rosin's popularity is that it is a solvent-less technique, so the process does not require the use of volatile hydrocarbon solvents. Instead, rosin uses a mechanical process involving heat and pressure to extract the desired components from the plant.

Solvent extraction systems utilize light hydrocarbons such as butane and/or propane as solvents. Often, these complex and mechanical systems require a lengthy purge to safely remove most of the residual solvents from the final product. Rosin, however, simply uses heat and pressure and does not require additional processing, so the final product is clean and ready in minutes. When compared to butane hash oil (BHO), the two can be aesthetically indistinguishable. Rosin, when made properly, retains as many or more valuable terpenoids and flavonoids that provide aroma and flavor, as well as clinically proven synergistic entourage effects. However, rosin does not contain residual hydrocarbons, giving it an "organic" quality.

Processes based on the use of non-aqueous solvents to extract compounds from plants are known and taught in the prior art. Solvents employed may be miscible or immiscible with water and vary in efficacy. Techniques used to extract compounds from plants include liquid and solid extraction, liquid and gas chromatography and other separation and fractioning techniques.

Traditionally, for plant materials, ethyl alcohol in various concentrations is used to extract active substances. Tinctures are ethanol solutions easily produced and well described in most major pharmacopoeias. Where the final concentration of alcohol is greater than approximately 20% by volume, the tincture remains microbiologically stable and widely used in compounding prescriptions. Ethanol extracts substances such as glycosides, flavonoids and alkaloid salts are examples of compounds known to be biologically active. Ethanol also extracts considerable amounts of plant pigment, such as chlorophyll and carotenoids. By using higher alcohol strengths, lipid-soluble material may be extracted. Tinctures typically contain less inert material than macerates or decoctions, but are still complex mixtures of plant chemical elements. Where alcohol is not required or desired, a tincture may be evaporated to produce ethanol free extracts.

Lipid solvents are also used to extract lipid soluble chemical elements from a Phyto-biomass. Examples are chlorinated solvents such as dichloromethane, chloroform, carbon-tetrachloride, hexane, ether, fluorinated hydrocarbons, and supercritical fluid extraction with inert agents such as carbon dioxide.

Using chlorinated solvents is highly disadvantageous for Phyto-biomass extraction because of extreme toxicity; and because for medicinal or pharmaceutical use such toxic solvents must be removed by various means before administration. Hexane and other petroleum-based solvents have good solvent activity; however, they must also be completely removed from any end product, and also carry the risk of fire and explosion during use.

Distillation and sublimation have been widely used to separate components of phytochemicals which have boiling points close to water. Chemical separation by distillation is widely used in the preparation of essential oils and also petrochemicals. However, elevating temperatures to extract a phytochemical from plant material or a phytochemical composition is extremely undesirable and disadvantageous in many cases, as the temperature adversely affects or changes many phytochemicals and plant compounds. One process that results from using high temperatures is decarboxylation of plant material. Decarboxylation is a chemical reaction that removes a carboxyl group and releases carbon dioxide ($CO_2$). Usually, decarboxylation refers to a reaction of carboxylic acids, such as removing a carbon atom from a carbon chain.

Presses have been used for extracting liquid from plant material to create concentrates. They are especially useful in solventless operations. Solvent-free products are often regarded as the superior product for medical and palliative purposes due to their purity to the plant. Unlike other concentrated products, a solvent-free product contains only what came from the plant. In doing so, this eliminates any risk of other compounds or chemicals interfering with a patient's treatment.

Cannabis extraction equipment now allows producers to create solventless products for patients in an array of consumption methods. Today, solventless extraction equipment includes enhanced rosin tech and extends to pills and tinctures as well.

Often, presses used by industrial companies are motorized for efficient extraction. In the field of cannabinoids, home growers and amateur rosin pressers have no need for such industrial products, nor do they need such capacity or throughput. A manually-operated press allows users to make concentrates with ease at home or anywhere and is therefore a better alternative for such users to those industrial machines. Moreover, laboratories and production facilities often need a small batch solution to trial run a specific lot to verify yields before committing to processing the rest of the lot. A manually-operated press is an affordable tool to run small batch tests while not interfering with production equipment.

Hand-operated presses, however, generally do not include ways for measuring the force applied to the plant in the course of operation. Nor do such hand-operated presses have built-in indicators or alarms to indicate when a pressing force exceeds a predetermined value.

The process of separating resin glands from plants matter was revolutionized through the ages with the addition of water and ice. Hand washing has been the standard method for years, but standing over a drum and stirring back and forth can be very labor intensive and exhausting. The present invention exploits the fact that mechanical agitation has adapted and transformed ancient techniques into the modern age.

DESCRIPTION OF RELATED ART

U.S. Published Patent Application No. 2011/0256245 on application of Rosenblatt, et al. for METHODS AND COMPOSITIONS OF CANNABIS EXTRACTS, published on Oct. 20, 2011, discloses a method for obtaining an extract from a cannabis plant for medical uses. In one embodiment, a method for obtaining an extract from a cannabis plant for medical uses is provided. The method comprises (a) providing cannabis flower trimmings with trichome material, (b) providing clean, cold water to at least cover cannabis the cannabis flower trimmings, (c) agitating the mixture of cannabis flower trimmings and water (d) soaking the cannabis flower trimming in cold water for at least one minute, (e) removing cannabis flower trimmings from the water, (f) removing the trichome material from the water and (g) drying the trichome material to contain no more than 10% total water weight.

U.S. Published Patent Application No. 2017/0051231 on application of Mancosky for METHOD OF EXTRACTING CBD, THC, AND OTHER COMPOUNDS FROM CANNABIS USING CONTROLLED CAVITATION, published on Feb. 23, 2017, discloses a method of extracting CBD, THC, desirable oils, and other compounds from the cannabis plant includes drying the plant, grinding or chopping the plant, mixing the resulting pieces of the plant with a fluid to form a mixture, circulating the mixture through a controlled cavitation reactor to liberate CBD, THC, desirable oils, and other compounds from the pieces, and separating the liberated CBD, THC, desirable oils, and other compounds from the fluid. The method may be used as an adjunct to or in combination with traditional extraction techniques such as leaching to increase yields.

U.S. Published Patent Application No. 2018/0094209 on application of Carberry, et al. for Extraction of Essential Oils, published on Apr. 5, 2018, discloses a method for extracting essential oils in which essential oils are extracted from a biomass through milling in a solvent to form a solution of the essential oil in the solvent. The solvent is or is part of a cover than reduces oxidative and other degradation of the essential oil during milling and isolation. The solubilized essential oil may be allowed to adhere to the originating milled biomass to form a feed or nutritional supplement. The solvent may be evaporated from the solubilized essential oil to form an essential oil concentrate. This essential oil concentrate may be used directly, adhered to a different biomass than the originating biomass, or used in combination with pharmaceutical, nutritional, or feed preparations. The essential oil concentrate is preferably adhered to the different biomass through milling under a cover to reduce oxidative and other degradation. The essential oil may be astaxanthin, capsaicin compounds, or cannabinoids.

U.S. Published Patent Application No. 2018/0369715 on application of Bruining for EXTRACTION DEVICE AND EXTRACTION METHOD FOR EXTRACTION OF CANNABIS, published on Dec. 27, 2018, discloses an extraction device for bringing cannabis into contact with an extraction fluid, wherein the device comprises a column provided with a bottom, and near the bottom with a continuous hole through which the extraction fluid is able to flow out of the column under the influence of gravity. In that way for instance oil can be extracted from cannabis.

U.S. Pat. No. 10,272,360 issued to Lopa for PHYTOCHEMICAL EXTRACTION SYSTEM AND METHODS TO EXTRACT PHYTOCHEMICALS FROM PLANTS INCLUDING PLANTS OF THE FAMILY CANNABACEAE SENSU STRICTO, issued on Apr. 30, 2019, discloses a method and system of and for extraction or removal of phytochemicals from plants, including those of the plant family Cannabaceae. More specifically, a method and system are disclosed for extracting essential oils from plants, such as cannabis, without the use of a solvent.

SUMMARY OF THE INVENTION

In accordance with the present invention, there is provided an apparatus for extracting cannabis essential oils. A housing is provided for containing trichome material from a cannabis plant, the housing having a sealable opening. A rotatable impeller is disposed in the housing. A container is connected to the housing for collecting essential oils. The process for extracting cannabis essential oils includes the steps of introducing trichome material from the cannabis plant into the housing, introducing water and ice into the housing via an opening therein, and agitating the water and the trichome material to separate and extract essential oils therefrom.

It is therefore an object of the invention to provide an apparatus for extracting cannabis essential oils without the use of solvents.

It is a further object of the present invention to provide an automated system that agitates trichome material from a cannabis plant, to facilitate extracting oils from such material.

It is another object of the present invention to provide an impeller disposed in the housing of such apparatus for effecting the agitation of trichome material from the cannabis plant.

It is a further object of the present invention to provide a method of extracting cannabis essential oils without the use of solvents by providing an automated system that agitates trichome material from the cannabis plant.

These and other objects and advantages of the present invention are more readily apparent with reference to the following detailed description and the accompanying drawings.

BRIEF DESCRIPTION OF THE DRAWINGS

A complete understanding of the present invention may be obtained by reference to the accompanying drawings, when considered in conjunction with the subsequent detailed description, in which.

Like reference numerals refer to like parts throughout the several views of the drawings.

DETAILED DESCRIPTION OF THE PREFERRED EMBODIMENT

Although the following detailed description contains specific details for the purposes of illustration, those of ordinary skill in the art will appreciate that variations and alterations to the following details are within the scope of the invention. Accordingly, the exemplary embodiments of the invention described below are set forth without any loss of generality to, and without imposing limitations upon, the claimed invention.

An apparatus is provided for extracting cannabis essential oils. A housing is provided for containing trichome material from a cannabis plant, the housing having a sealable opening. A container is connected to the housing for collecting essential oils. The process for extracting cannabis essential oils includes the steps of introducing trichome material from the cannabis plant into the housing, introducing water and ice into the housing via an opening therein, and agitating the water and the trichome material to separate and extract essential oils therefrom.

Figure 1:
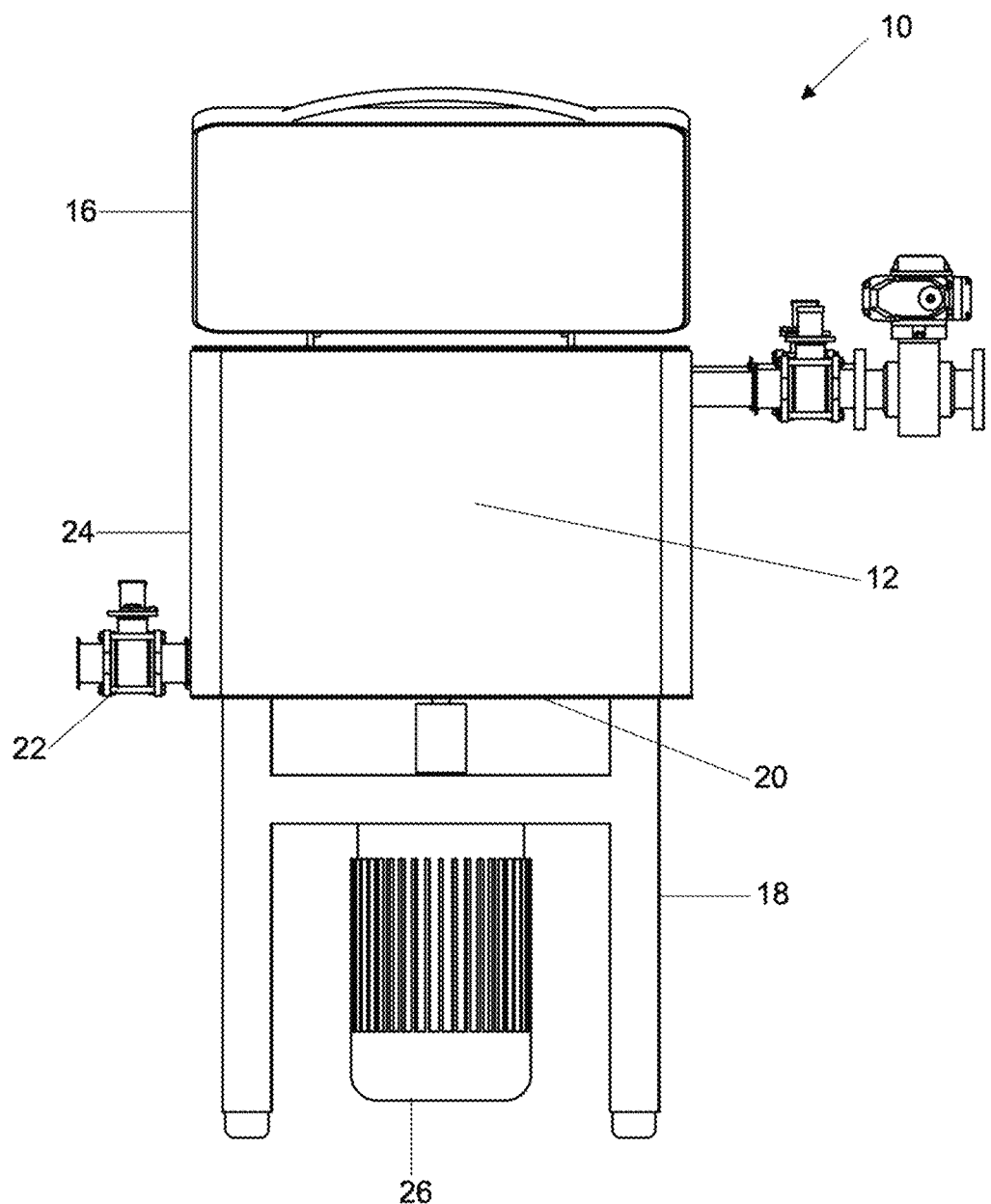
FIG. 1 is a schematic view of an apparatus for solventless extraction of cannabis essential oils in accordance with the present invention.
Figure 2:
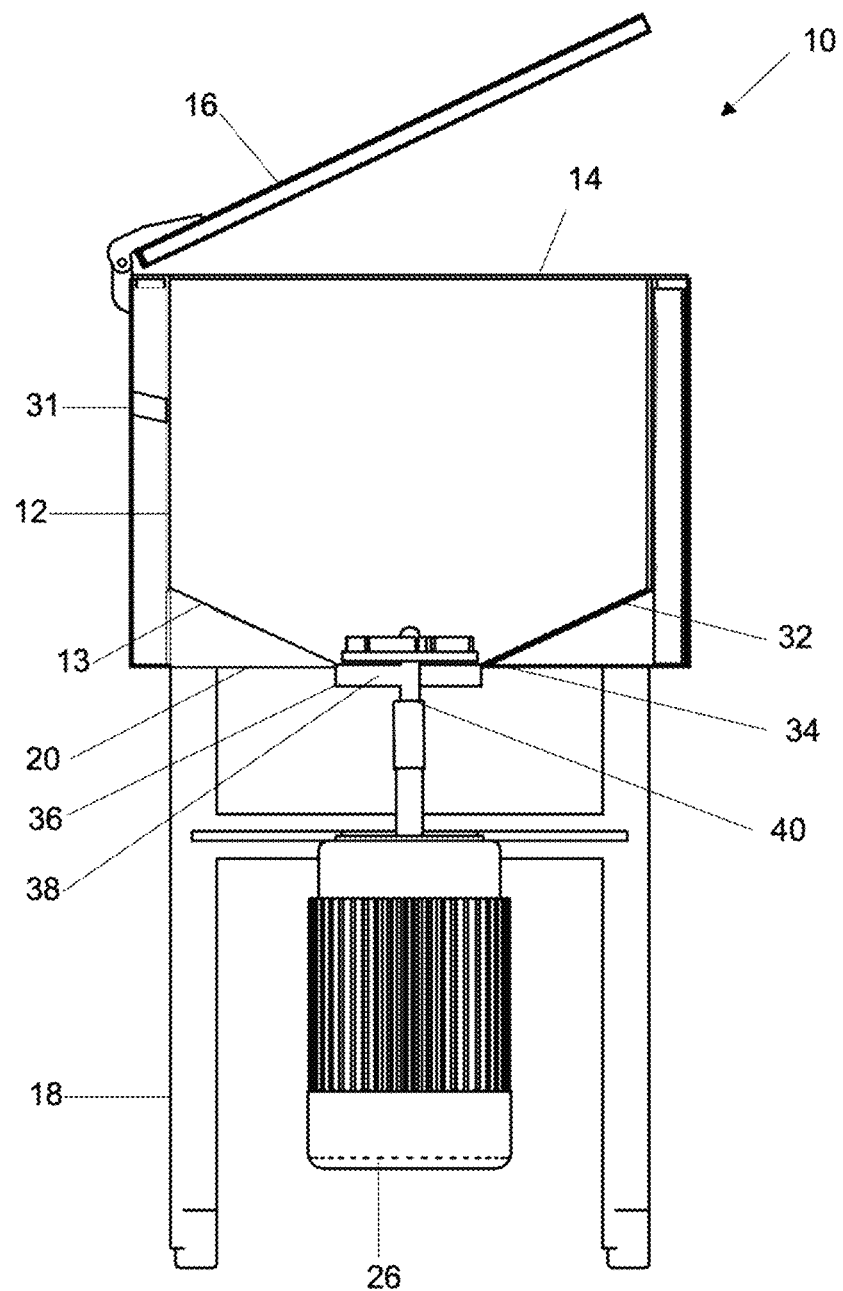
FIG. 2 is a schematic, front, cut-away view of the apparatus shown in FIG. 1.

Referring now to FIGS. 1 and 2, there are shown schematic views of an apparatus 10 for solventless extraction of cannabis essential oils in accordance with the present invention.

A substantially cubical, hollow housing 12 (hereinafter "agitator" or "mixing vessel") having an opening 14 at the top thereof and a closeable lid 16 is supported by a four-legged structure 18 to provide space between the lower surface 20 of housing 12 and a surface on which apparatus 10 rests. Housing 12 in the preferred embodiment is substantially cubical in shape, but it should be understood that any geometric shape can be used as a housing without departing from the scope of the invention. An output tube or pipe 22 is inserted in a lower portion 24 of housing 12.

Positioned beneath lower surface 20 of housing 12 in the space between lower surface 20 of housing 12 and a surface on which apparatus 10 rests is a removable collection vessel 26 for receiving extracted essential oils, not shown.

Referring still to FIG. 2, there is shown a schematic, front, cut-away view of inventive apparatus 10. A frustoconical mixing vessel 13 is disposed in housing 12. An optional sight glass 31 or series thereof can be installed in housing 12 and mixing vessel 13 so an operator, not shown, can view extraction operations as they are performed.

A lower portion 32 of mixing vessel 13 is tapered downwardly. At the lower extremity 34 of mixing vessel 13 and contained therein is disposed an impeller 36 and associated electrical motor 38 for actuation thereof. Impeller 36, in the preferred embodiment, is a Model MCI, manufactured by the Magic City Machinery Company, although other suitable impellers can be used, as is well known in the art. An output aperture 40 is formed at lower extremity 34 of mixing vessel 13. Disposed beneath output aperture 40 and supported by housing 12 is collection vessel 26.

Figure 3:
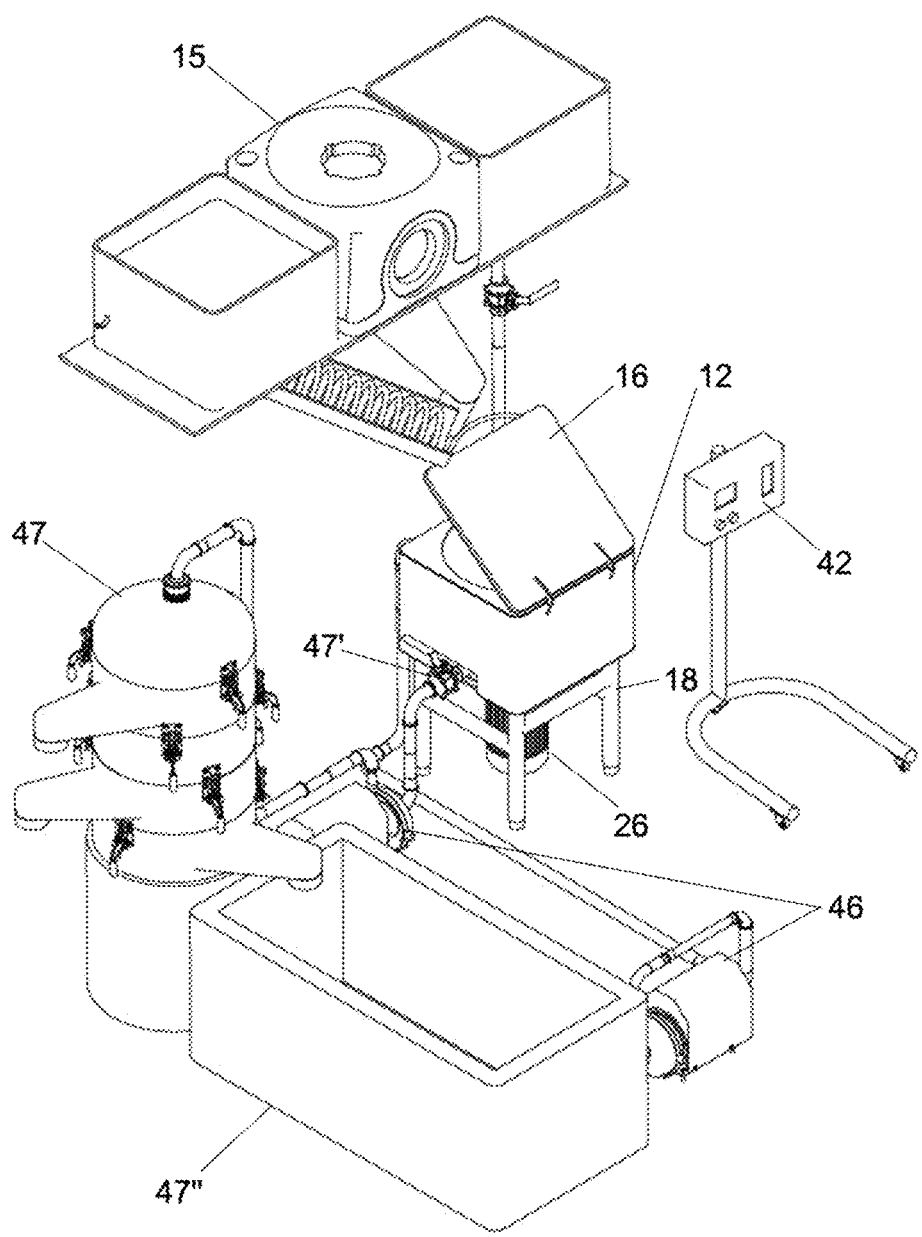
FIG. 3 is an exploded, schematic view of components that comprise the apparatus of the present invention.

Referring now also to FIG. 3, optionally, a remote start, digital timer control and variable drive control 42 can be operatively connected to electrical motor 38 (FIG. 2) to control operation thereof. Digital timer control and variable drive control 42, in the preferred embodiment, is a Model No. Logo, manufactured by the Siemens Company, although other suitable digital timer and variable drive controls can be used, as is well known in the art. A camera 44 under direction of remote start, digital timer control, and variable drive control 42 can also be installed to monitor progress of agitation of the contents of mixing vessel 13. Camera 44, in the preferred embodiment, is a Model No. VS 101, manufactured by the Heidenhain Company, although other suitable cameras can be used, as is well known in the art. When automated with the foregoing elements, apparatus 10 can be one of several such devices in a facility that can operate simultaneously.

Operatively connected to opening 14 is an overhead ice and water dispenser unit 15, comprising a water supply 15' and biomass supply 15" that provides reverse osmosis ice and water, when needed, to regulate temperature, inter alia, of the contents of mixing vessel 13.

Figure 4:
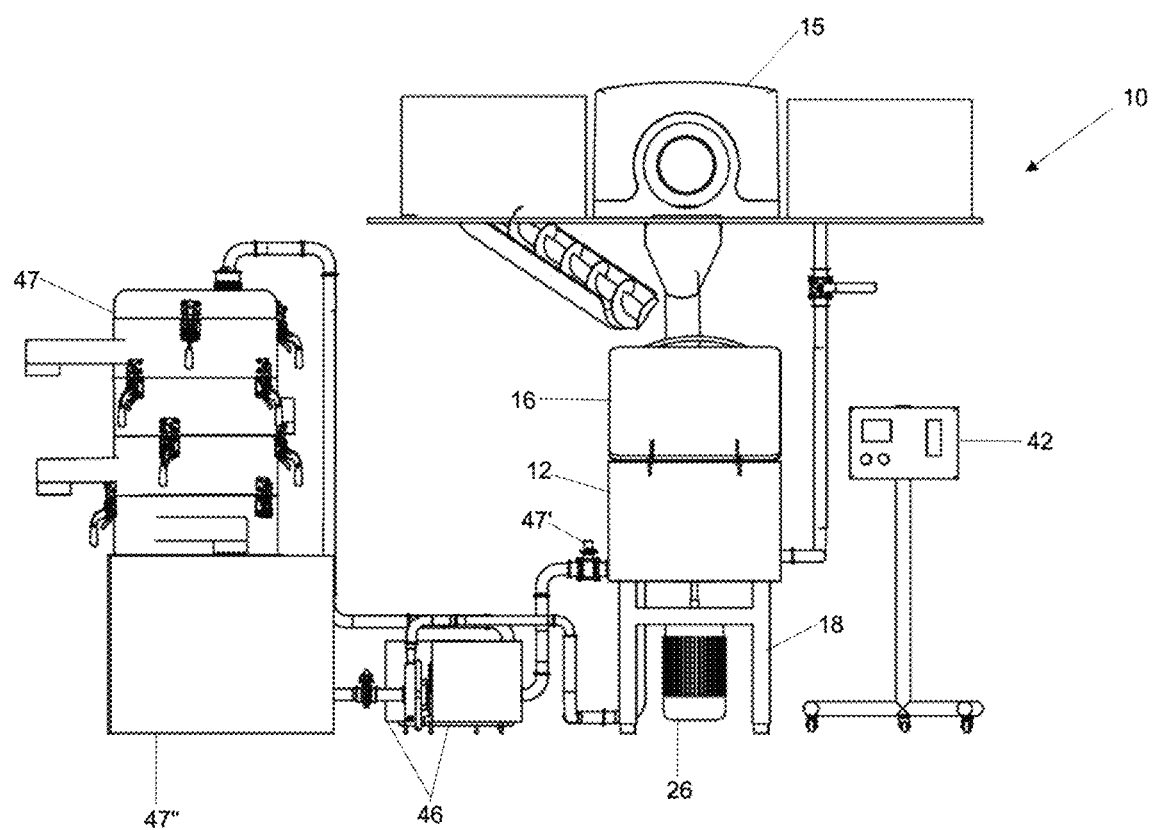
FIG. 4 is a schematic view of the components shown in FIG. 3 connected to one another.

Referring now also to FIG. 4, optionally, one or more sanitary pumps 46 can be installed in operative relation to mixing vessel 13 via a two-way fill valve 47' for sanitization thereof between operative cycles. Sanitary pumps 46, in the preferred embodiment, are Model MCP, manufactured by the Magic City Machinery Company, although other suitable sanitary pumps can be used, as is well known in the art. Sanitary pumps 46 are part of a system that includes a vibratory sifter 47 and a stand-by reservoir 47" operatively connected thereto for receiving filtered liquid, not shown.

Figure 5:
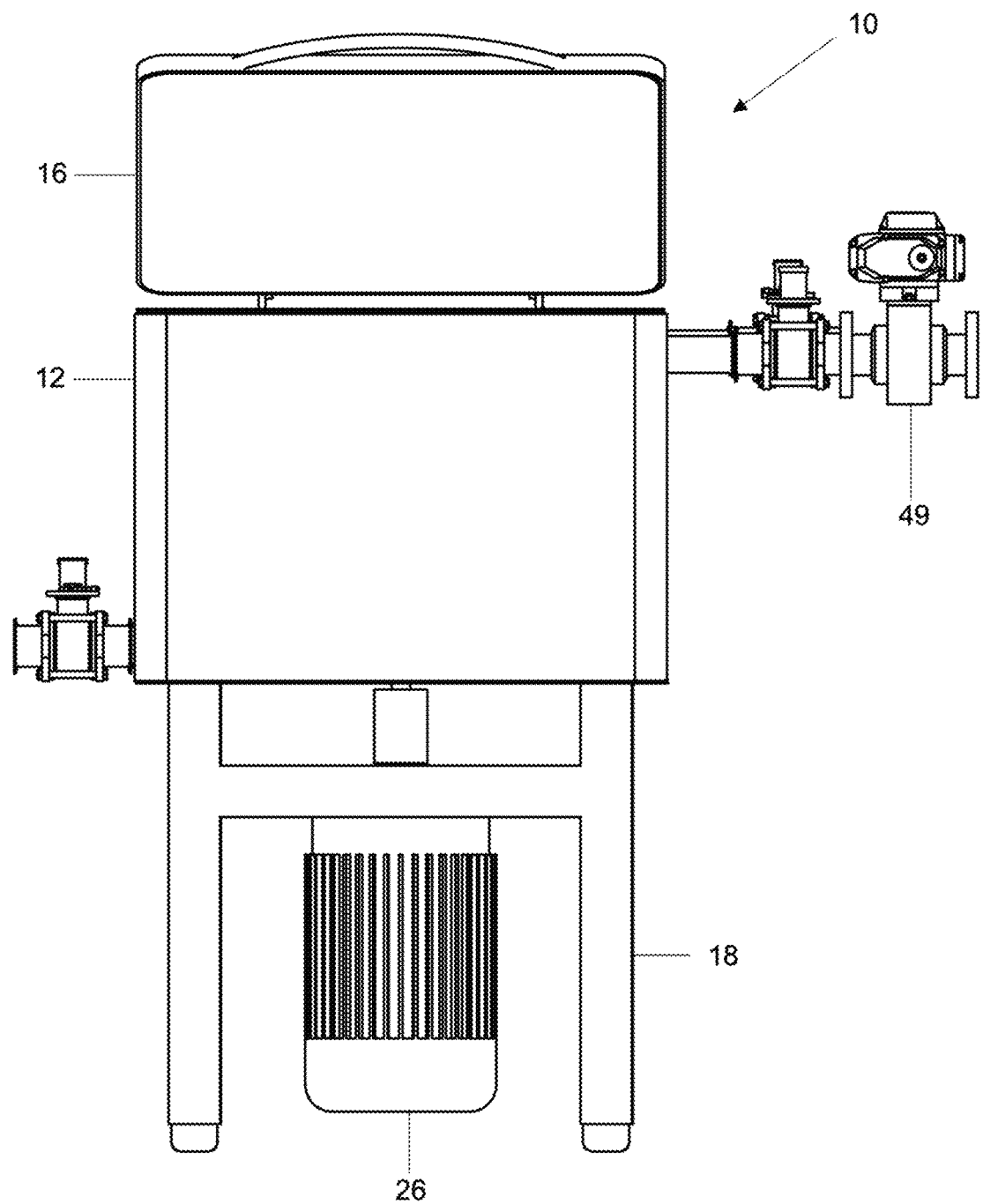
FIG. 5 is a schematic view of the inventive apparatus with flow meter.

Referring now to FIG. 5, a flow meter 49 is disposed at the upper portion of mixing vessel 13. Flow meter 49, in the preferred embodiment, is a Model HFT, manufactured by the Dwyer Company, although other suitable flow meters can be used, as is well known in the art.

Figure 6:
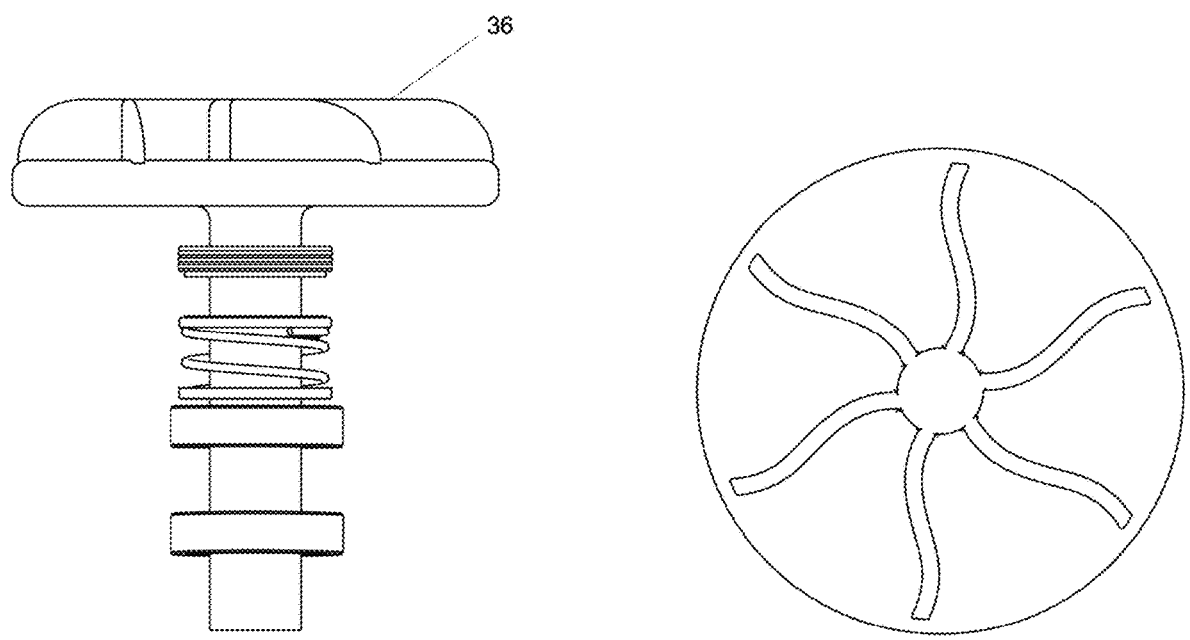
FIG. 6 is a schematic view of the front and top views of an impeller for use with the inventive apparatus.

Referring now also to FIG. 6, the front and top views of impeller 36 are illustrated.

Figure 7:
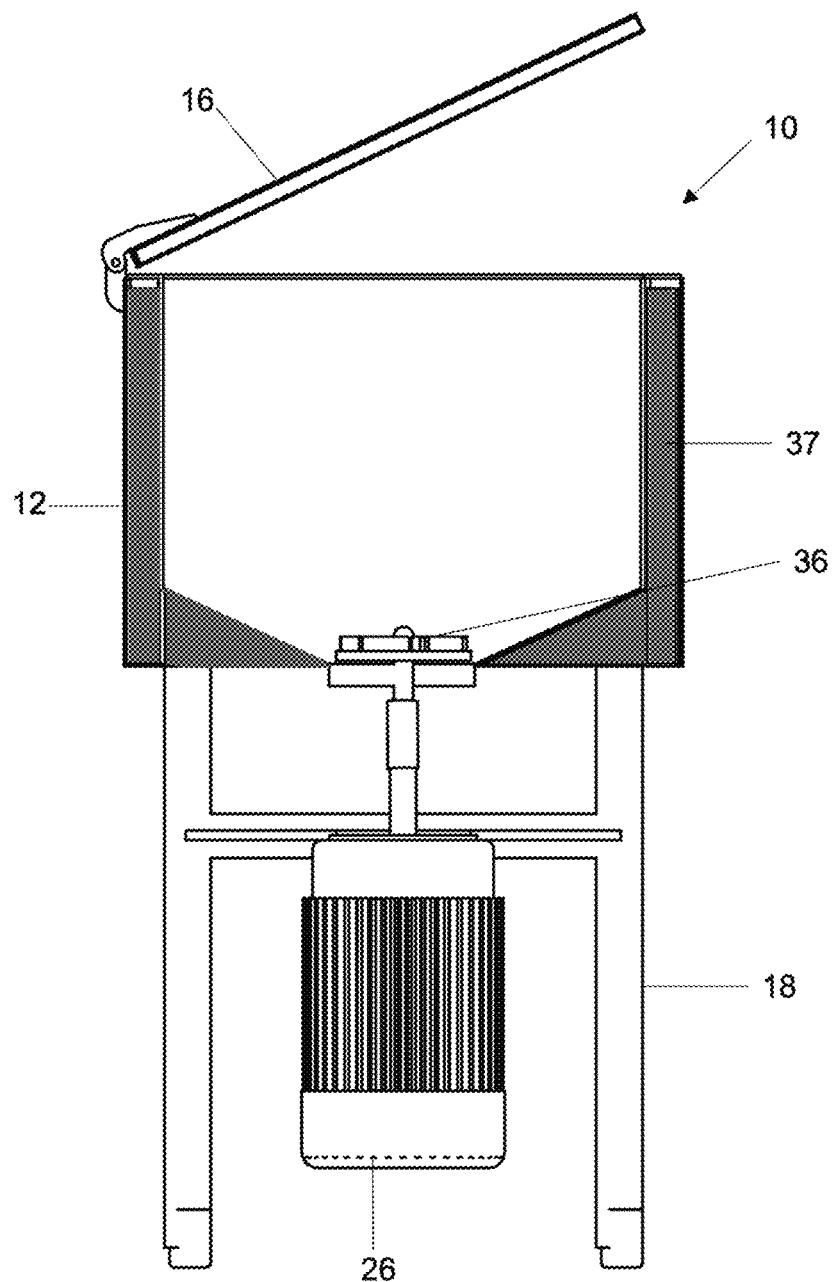
FIG. 7 is a schematic, cut-away view of the inventive apparatus with insulation.

Referring now also to FIG. 7, suitable insulation 37 is placed around mixing vessel 13 inside housing 12.

Figure 7A:
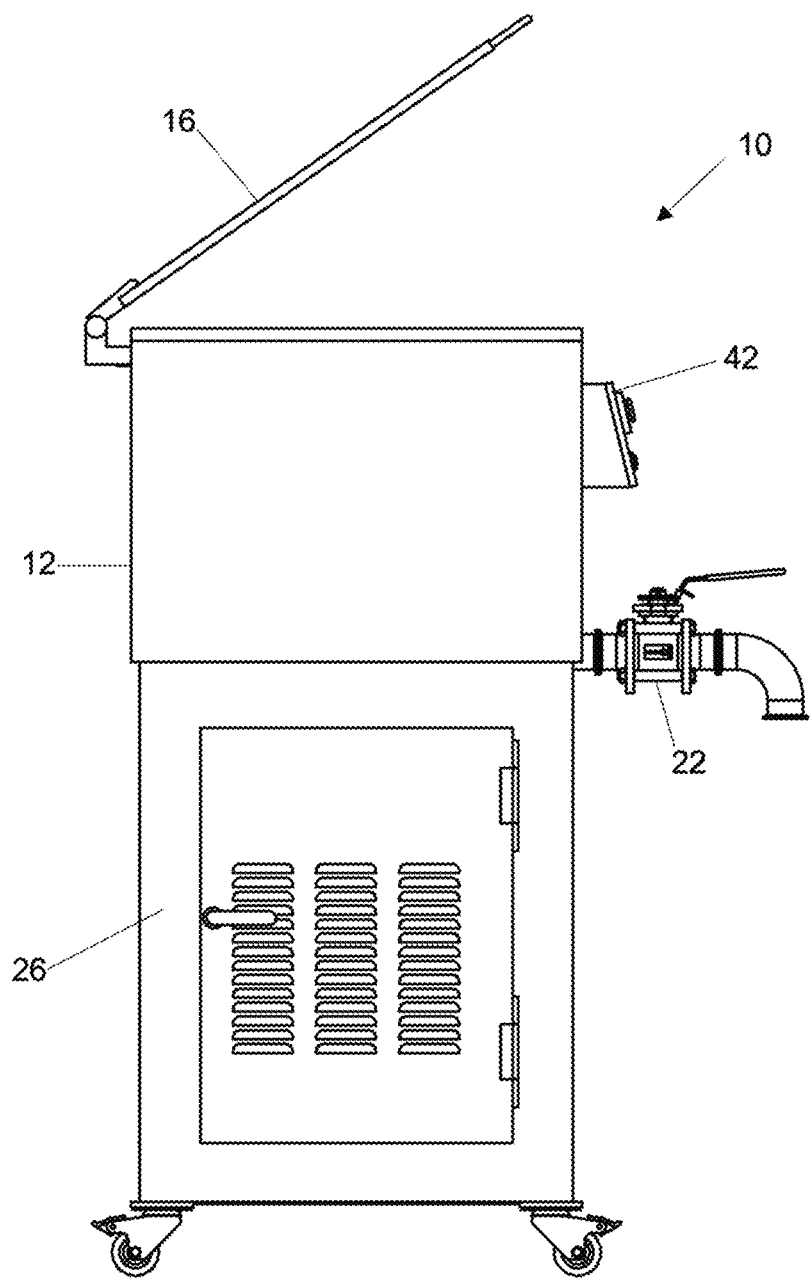
FIG. 7A is a schematic view of an alternate embodiment of the inventive apparatus.

Referring now also to FIG. 7A, there is shown an alternative embodiment of the invention, in which housing 12 is unitary, the lower portion thereof 26' covering collection vessel 26 (FIG. 1) and impeller 36 (FIG. 2). Digital timer control and variable drive control 42 is mounted on the front of apparatus 10.

Figure 8:
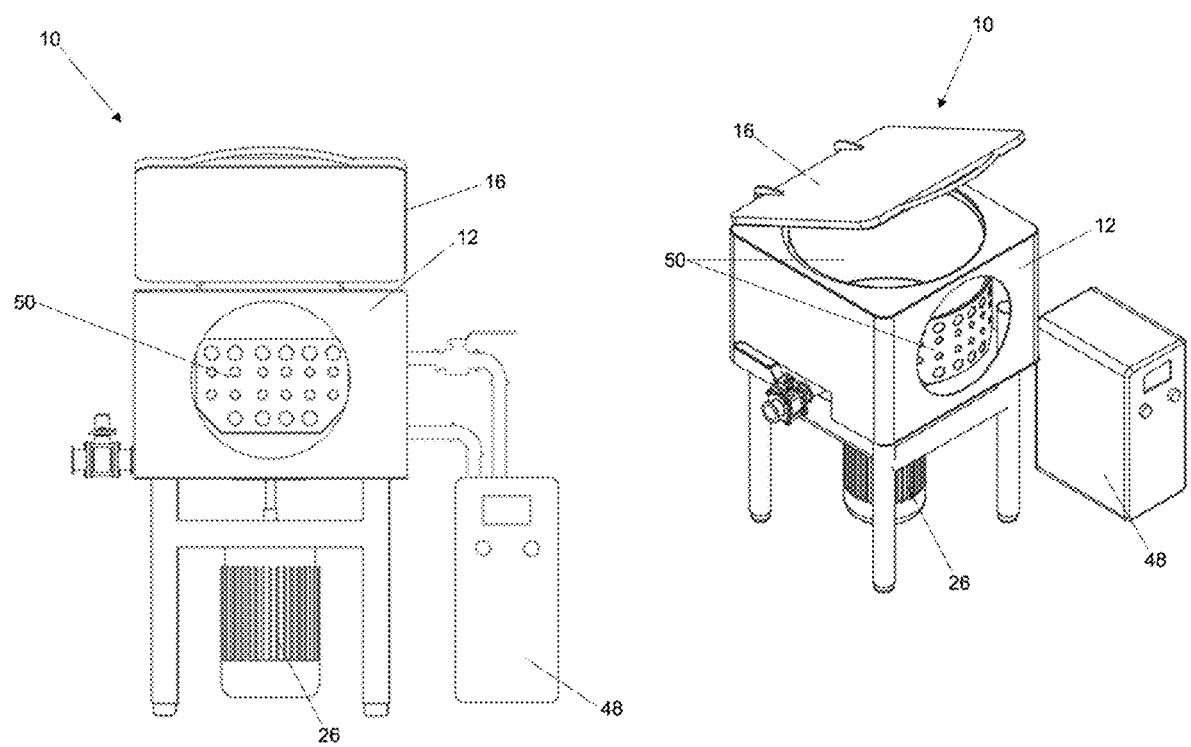
FIG. 8 is a schematic, cut-away view of the inventive apparatus with dimpled jacket cooling system.

Referring now to FIG. 8, a suitable temperature gauge and control 48 proximate and operatively connected to mixing vessel 13 can be installed to monitor the temperature of the contents of mixing vessel 13 before, during, and/or after an extraction cycle. Temperature gauge and control 48, in the preferred embodiment, is a Model No. RTD-6, manufactured by the Dwyer Company, although other suitable temperature gauge and controls can be used, as is well known in the art. A heating/chiller unit, which is part of a dimpled jacket cooling system 50 with ultrasonic frequency generator 46, can be controlled by remote start, digital timer control and variable drive control 42 in response to continuous temperature readings of temperature gauge 48.

Figure 9:
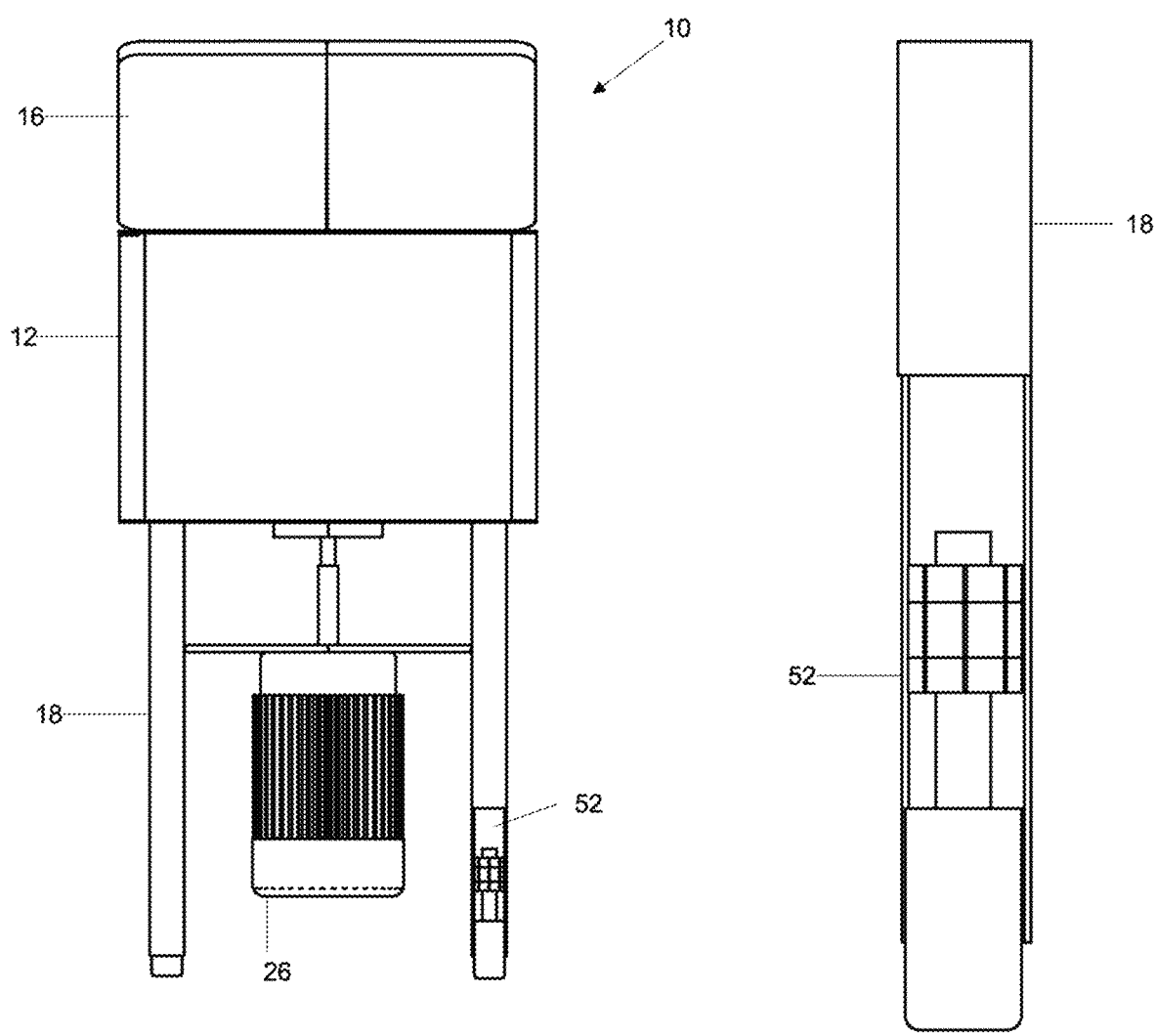
FIG. 9 is a schematic, partially cut-away view of the inventive apparatus with a load cell.

Referring now also to FIG. 9, one or more piezo-electric load cells 52 can also be installed in legs 18 supporting mixing vessel 13 to monitor the quantity of trichome and/or water introduced thereinto. Load cells 52, in the preferred embodiment, are Model LC302-1k, manufactured by the Omega Company, although other suitable load cells can be used, as is well known in the art. Load cells 52 are also under the control of remote start, digital timer control and variable drive control 42, if desired.

Figure 10:
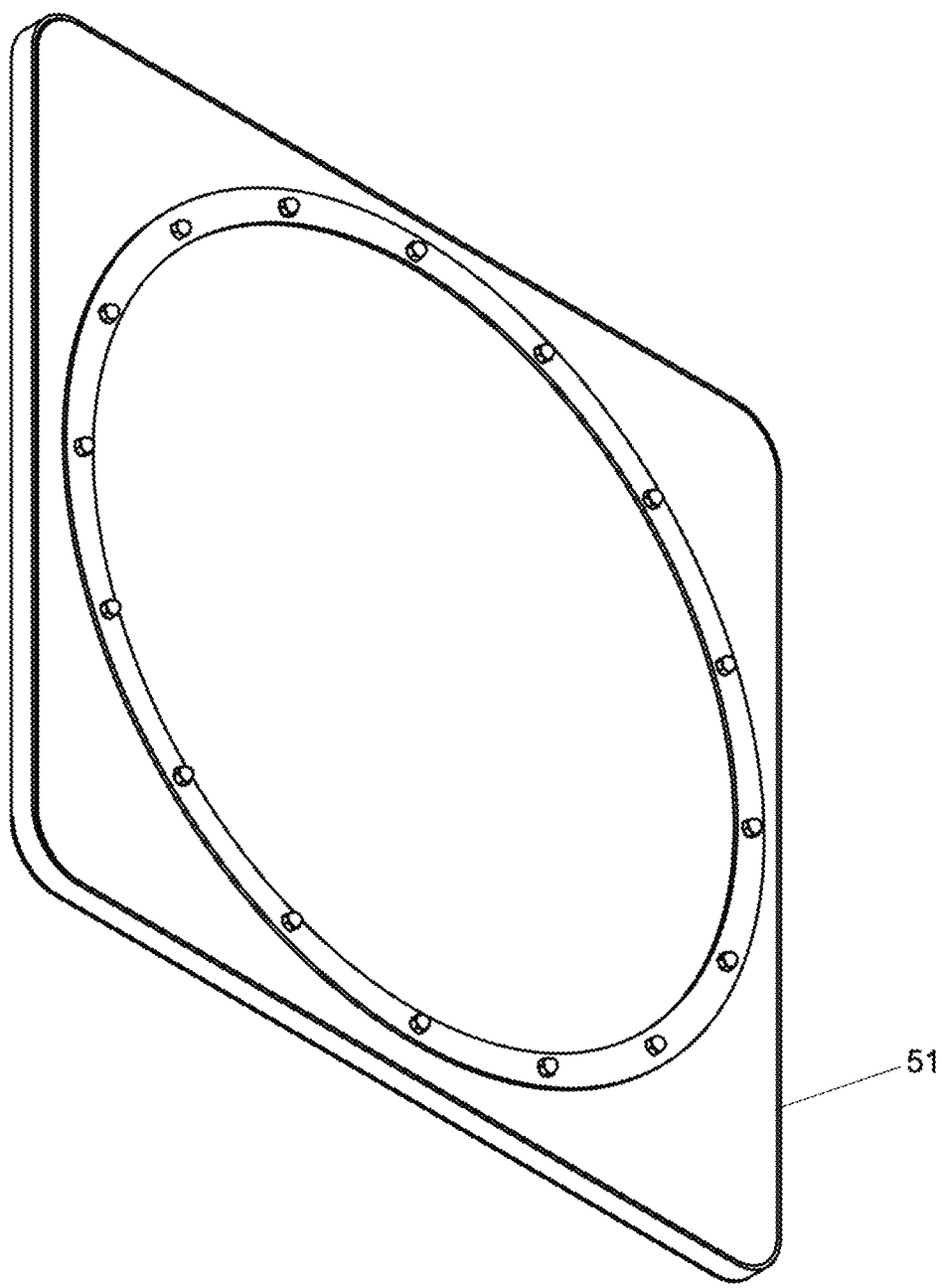
FIG. 10 is a perspective view of a port hole hatch for use with the inventive apparatus.

Referring now also to FIG. 10, a perspective view of a port hole hatch 51 is shown.

Figure 11:
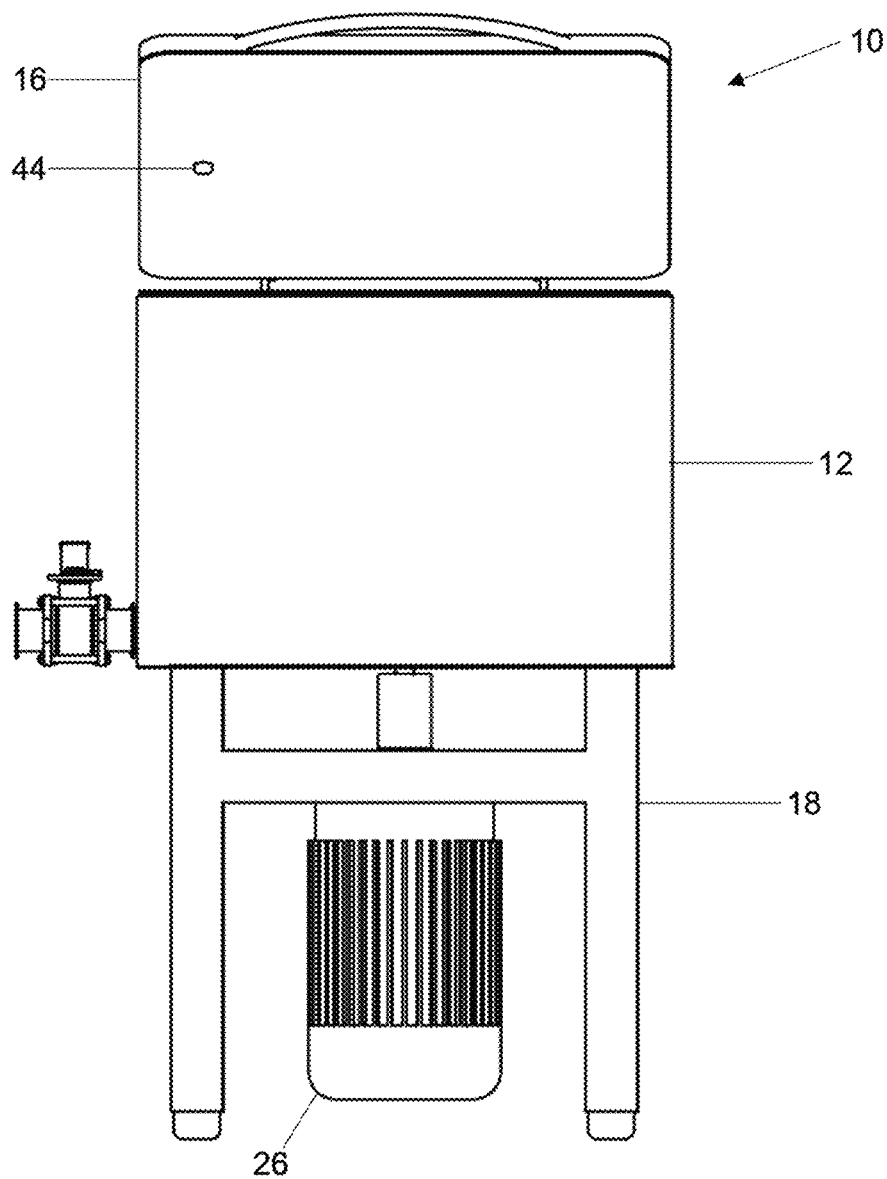
FIG. 11 is a schematic view of the inventive apparatus with a remote view camera.

Referring now also to FIG. 11, a remote view camera 44 can be attached to lid 16 of apparatus 10 so the cannabis essential oil extraction process within mixing vessel 13 can be observed at a remote location. Remote view camera 44, in the preferred embodiment, is a Model No. VS-101, manufactured by the Heidenhain Company, although other suitable cameras can be used, as is well known in the art.

Figure 12:
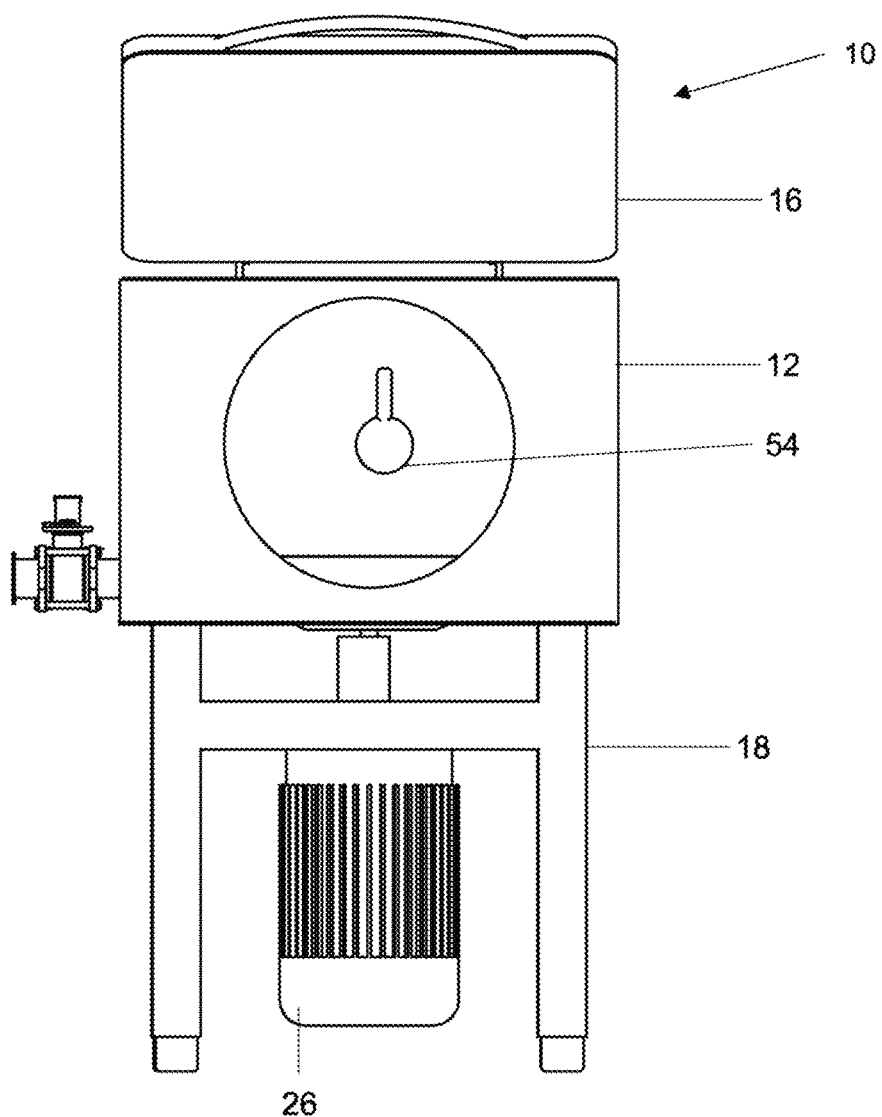
FIG. 12 is a schematic view of the inventive apparatus with a thermocouple.

Referring now also to FIG. 12, a thermocouple can be operatively connected to mixing vessel 13 to monitor temperature of the cannabis essential oil extraction process therein. Thermocouple, in the preferred embodiment, is a Model No. RTD-6, manufactured by the Dwyer Company, although other suitable thermocouples can be used, as is well known in the art.

Figure 13:
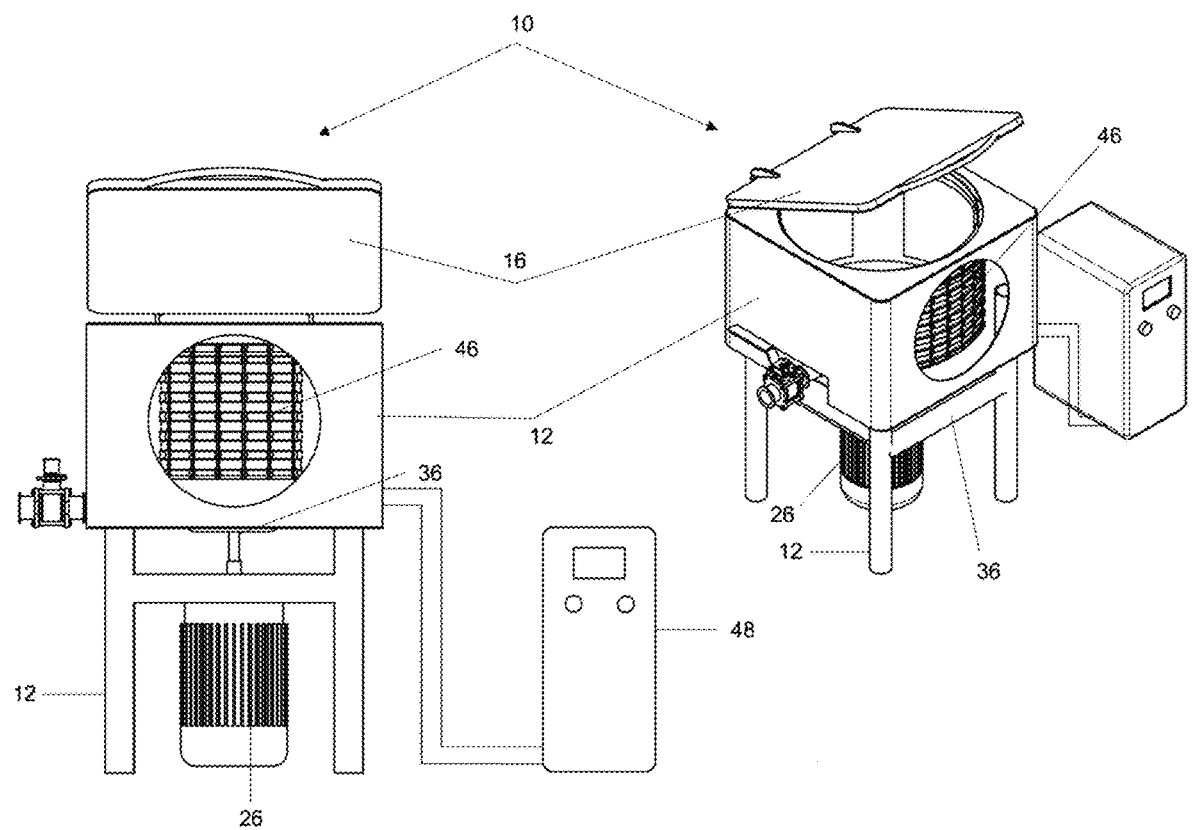
FIG. 13 is a schematic, partially cut-away view of the inventive apparatus with an ultrasonic frequency generator.

Referring now also to FIG. 13, optionally, ultrasonic frequency generator 46 is operatively connected to mixing vessel 13 to impart ultrasonic vibrations thereto in order to help facilitate agitation of the contents thereof. Ultrasonic generator 46, in the preferred embodiment, is a Model No. SweepSonik 3, manufactured by the Blackstone-NEY Ultra-Sonics Company, although other suitable ultrasonic generators can be used, as is well known in the art. In some embodiments, ultrasonic generator 46 can be used in conjunction with impeller 36 or, instead of impeller 36, to accomplish the required agitation of the contents of mixing vessel 13.

Figure 14:
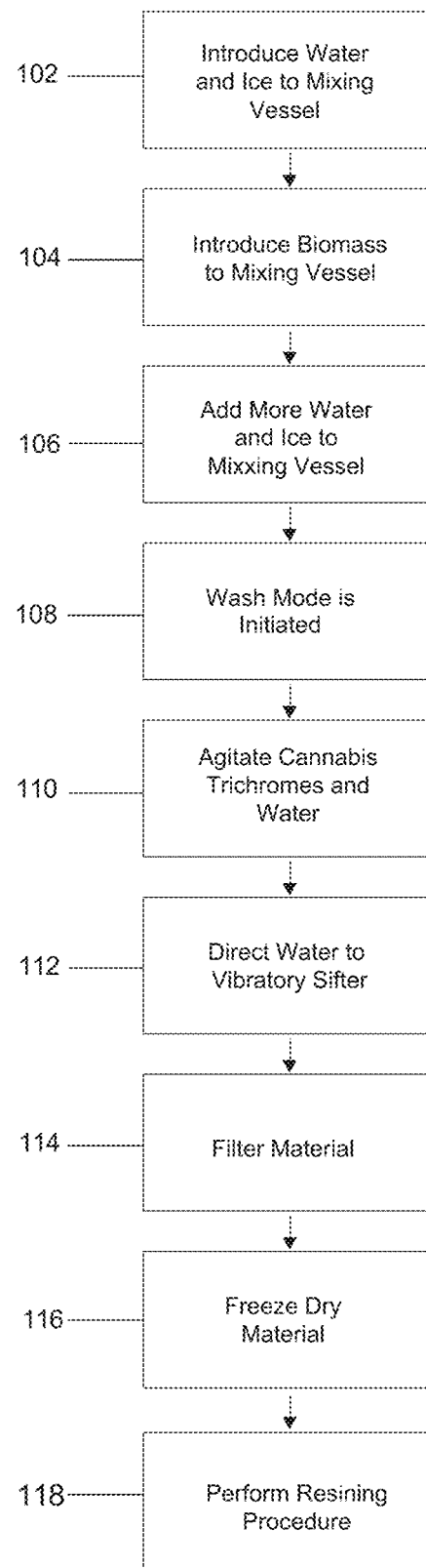
FIG. 14 is a flow chart of operations in accordance with the present invention.

Referring now also to FIG. 14, there is shown a flow chart of operations 100 in accordance with the invention. In operation, lid 16 is opened or removed, allowing cannabis trichomes, not shown, to be introduced to mixing vessel 13 in housing 12. Reverse osmosis water and ice are first introduced to fill approximately half of the capacity of mixing vessel 13, step 102. The water and ice mixture are left in mixing vessel 13 to acclimate until the temperature thereof has reached approximately 32 degrees Fahrenheit.

Biomass is then introduced into the agitator 12, step 104. Both water and trichome material can also be controlled by remote start, digital timer control and variable drive control 42. The biomass can be placed in a 220-micron filter bag, not shown, with a heavy-duty zipper, to improve the quality of the cold water trichome separations. An operator, not shown, has the option of directly introducing material into the machine 10. This semi-automatic procedure is known as running the material "raw."

Additional ice and water are added to a fill line over the biomass, step 106.

Once the material is introduced into the ice-cold water, a wash mode is initiated, step 108, at which point impeller 36 is activated for a predetermined time to vigorously agitate the cannabis trichomes and water, step 110, at which time the resign glands, which are denser than the water, separate from the plant material. Essential oils are extracted by gravity feed to collection vessel 26, the contents of which may be removed or drained.

The wash mode and duration of cycle are selected and the machine is started from the control panel, step 108. Machine cycles are fully customizable, depending on an operator's preference and the characteristics of the starting material. The system can be dialed in for the perfect amount of agitation for maximum yield.

Once the cycle is complete, the sanitary pump and sifter are turned on, step 112. The drain valve is opened to allow the flow of water to the top of the vibratory sifter.

Once the water and resin gland mixtures are introduced into the vibratory sifter, they begin to be filtered through a series of stainless-steel screens, step 114, with precise micron ratings via high frequency vibrations in order to separate the different grades.

Catch cans are then emptied and labeled into special trays for the freeze dryer, step 116. Freeze drying, also known as lyophilization or cryodesiccation, is a low temperature dehydration process that involves freezing the product, lowering pressure, then removing the ice by sublimation. After the product has come out of the freeze dryer, it is ready for sale or consumption.

Optionally, a rosining procedure can be performed, step 118, for removing any leftover particulate from the resin glands. Rosin is a solventless extract that uses heat and pressure to force the compounds within the trichome gland out of the cannabis plant, where all of the THCA, other cannabinoids, and terpenes are located.

One or more of an electrical component associated with this apparatus may comprise of: electrical motor 38, camera 44, ultrasonic frequency generator 46, load cells 52, overhead ice and water dispenser unit 15, sanitary pump 46, flow meter 49, temperature gauge and control 48, and heating/chiller unit 50.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a great number of variations of the devices, device components, and method steps set forth in the present description. As will be obvious to one of skill in the art, methods and devices useful for the present methods can include a great number of optional composition and processing elements and steps.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when compositions of matter are claimed, it should be understood that compounds known and available in the art prior to Applicant's invention, including compounds for which an enabling disclosure is provided in the references cited herein, are not intended to be included in any composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of," and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. An apparatus for extracting cannabis essential oils, comprising:
    a) a housing for containing trichome material from a cannabis plant, the housing having a sealable opening and a removable lid for covering the opening;
    b) a mixing vessel disposed in the housing for containing the cannabis trichome material and water and a rotatable impeller operatively connected thereto;

c) a collection vessel operatively connected to the housing for collecting essential oils;

d) a remote start, digital timer control and variable drive control for controlling functions of one or more of an electrical component associated with the apparatus; and e) an electrical motor operatively connected to the remote start, digital timer control and variable drive control and to the rotatable impeller for activation thereof.

2. The apparatus for extracting cannabis essential oils in accordance with claim 1, further comprising:

a) a camera operatively connected to the remote start, digital timer control and variable drive control for monitoring extraction operations as they occur.

3. The apparatus for extracting cannabis essential oils in accordance with claim 1, further comprising:

a) an ultrasonic generator operatively connected to the remote start, digital timer control and variable drive control and to the mixing vessel for introducing vibration to, and increasing agitation of, the contents in the mixing vessel.

4. The apparatus for extracting cannabis essential oils in accordance with claim 1, further comprising:

a) a sanitary pump operatively connected to the remote start, digital timer control and variable drive control for sanitizing the mixing vessel after an extraction cycle of the apparatus.

5. The apparatus for extracting cannabis essential oils in accordance with claim 1, further comprising:

a) a temperature gauge proximate the mixing vessel and operatively connected to the remote start, digital timer control and variable drive control to continuously monitor the temperature of the contents of the mixing vessel.

6. The apparatus for extracting cannabis essential oils in accordance with claim 5, further comprising:

a) a heater/chiller unit operatively connected to the remote start, digital timer control and variable drive control and to the temperature gauge to change the temperature of the contents of the mixing vessel pursuant to temperature readings of the temperature gauge.

7. The apparatus for extracting cannabis essential oils in accordance with claim 1, further comprising:

a) four piezo-electric load cells operatively connected to the remote start, digital timer control and variable drive control and proximate the mixing vessel to monitor the quantity of trichome and water introduced thereinto.

\* \* \* \* \*